United States Patent [19]
Jain et al.

[11] Patent Number: 6,061,322
[45] Date of Patent: May 9, 2000

[54] OPTICAL STORAGE SYSTEM HAVING OPTICAL HEAD WITH A SOLID IMMERSION LENS AND OPERATING ON MEDIA WITH AT LEAST TWO RECORDING LAYERS

[75] Inventors: Amit Jain, Sunnyvale; Gordon R. Knight, Saratoga, both of Calif.

[73] Assignee: TeraStor Corporation, San Jose, Calif.

[21] Appl. No.: 09/258,025

[22] Filed: Feb. 25, 1999

Related U.S. Application Data

[63] Continuation of application No. 08/720,808, Oct. 1, 1996, Pat. No. 5,936,928.

[51] Int. Cl.$^7$ .................................................... G11B 7/00
[52] U.S. Cl. .................... 369/99; 369/44.14; 369/44.23; 369/94; 369/112
[58] Field of Search .................................. 369/99, 44.14, 369/44.23, 94, 112; 359/664

[56] References Cited

U.S. PATENT DOCUMENTS 5,449,590   9/1995   Imaino et al. ........................... 430/273

OTHER PUBLICATIONS

Kurt A. Rubin, et al.; "Volumetric Magneto–Optic Storage On Multiple Recording Surfaces"; Jul. 8–12, 1996; Technical Digest, 1996, vol. 12.

Kurt A. Rubin, et al.; "Multilevel Volumetric Optical Storage"; 1994; SPIE vol. 2338 Optical Data Storage, pp. 247–253.

*Primary Examiner*—Tan Dinh
*Assistant Examiner*—Kim-Kwok Chu
*Attorney, Agent, or Firm*—Fish & Richardson, P.C.

[57] ABSTRACT

A system for reading or writing data from or to a bilevel optical recording medium with a flying head. The system includes a head having a slider and a solid immersion lens mounted at least partially within the slider. The solid immersion lens has a partial spherical surface and a substantially flat surface. The head also has an objective lens mounted to the slider. The system also includes a multilevel recording medium. The medium has a first media layer and a first substrate layer adjacent to the first media layer. The medium also has at least one second media layer adjacent the side of the first substrate layer opposite from the first media layer, and a second substrate layer adjacent the side of the second media layer opposite from the first substrate layer. The total effective numerical aperture of the system is greater than one for all layers.

42 Claims, 4 Drawing Sheets

OPTICAL STORAGE SYSTEM HAVING OPTICAL HEAD WITH A SOLID IMMERSION LENS AND OPERATING ON MEDIA WITH AT LEAST TWO RECORDING LAYERS

This application is a continuation of U.S. application Ser. No. 08/720,808, filed Oct. 1, 1996, now U.S. Pat. No. 5,936,928, issued on Aug. 10, 1999.

FIELD OF THE INVENTION

The present invention relates generally to optical recording media, and more particularly to a multilayer media for use with a flying head having a solid immersion lens.

BACKGROUND

Optical data storage systems are of great commercial and academic interest because of their potential for very high density data storage. Unlike magnetic recording where data density may be limited by particle size, the density of optical recording is limited only by the diffraction limit of the illuminating light. In practice, the data density is in part also limited by how small illuminating radiation, such as a laser beam, can be focussed on the disk. To reduce the laser spot diameter, several methods can be employed. Higher frequency light may be used because it has a shorter wavelength. Increasing the numerical aperture of the lens may decrease spot size. SIL system, incoming converging rays from an objective lens are refracted at a spherical surface of the SIL, resulting in an increased effective numerical aperture. More details on the effect of a SIL are described in U.S. patent application Ser. No. 08/641,513, filed May 1, 1996, and Ser. No. 08/657,145, filed Jun. 3, 1996, both assigned to the assignee of the present invention, and both of which are hereby incorporated by reference.

An object of the invention is to provide a multilayer optical recording system in which a SIL is used in a multilayer optical recording system for optimum data densities.

SUMMARY

In one aspect, the invention is directed to a system for reading or writing data from or to a bilevel optical recording medium with a flying head. The system includes a head having a slider and a solid immersion lens mounted at least partially within the slider. The solid immersion lens has a partial spherical surface and a substantially flat surface. The head also has an objective lens mounted to the slider. The system also includes a bilevel recording medium. The medium has a first media layer and a first substrate layer adjacent to the first media layer. The first substrate layer has a thickness of up to about r/n, where r is the radius of the partial spherical surface and n is the index of refraction of the solid immersion lens. The medium also has a second media layer adjacent the side of the first substrate layer opposite from the first media layer, and a second substrate layer adjacent the side of the second media layer opposite from the first substrate layer. The total effective numerical aperture of the system is greater than one for all layers.

In another aspect, the invention is directed to a system for reading or writing data from or to a multilayer optical recording medium with a flying head. The multilayer recording medium includes a plurality of recording layers and a plurality of gap plates located between pairs of recording layers. The total effective numerical aperture of the system is greater than one for all layers.

Implementations of the invention include the following. The overall thickness of the plurality of gap plates and the plurality of recording layers is less than the optical tolerance of the solid immersion lens. The optical tolerance of the solid immersion lens is from about −50 microns to about 50 microns. On the side of the first recording layer opposite the first gap plate is located a transparent dielectric material. One of the plurality of recording layers is of a selectively reflective material.

In another aspect, the invention is directed to a system for reading or writing data from or to a multilayer optical recording medium with a flying head. The multilayer recording medium includes a plurality of media layers and a plurality of substrate layers interlaced with the plurality of media layers. The thickness of the plurality of media layers, the substrate layers and the solid immersion lens being up to about r/n, where r is the radius of the partial spherical surface and n is the index of refraction of the solid immersion lens. The total effective numerical aperture of the system is greater than one for all layers.

Implementations of the invention include the following. The thickness of the first substrate layer is about r/n. The objective lens is a micro-focussing objective. The optical clear path passes the electromagnetic radiation back and forth from the objective lens through the spherical surface of the solid immersion lens to the flat portion of the solid immersion lens. The flat portion of the solid immersion lens is flat, a flat plate or substantially co-planar with the air-bearing surface. The distance between a top surface of the optical recording medium and the air-bearing surface is less than one wavelength of light. The solid immersion lens has the shape of a hemisphere. On the side of the first media layer opposite the first substrate layer is located a transparent dielectric material such as silicon nitride. The second substrate is made of a material of the group consisting of plastic, glass, or aluminum. The numerical aperture of the objective lens is between about 0.45 and 1.0. The index of refraction of the solid immersion lens is between 1.4 and 2.5. The mass of the objective lens is less than about 35 milligrams. The radius of the spherical portion of the solid immersion lens is less than about 2 millimeters. One of the first or second media layers is of a phase-change type or of a magneto-optic type. The second media layer is a selectively reflective material.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

DESCRIPTION OF THE PREFERRED EMBODIMENTS

Figure 1:
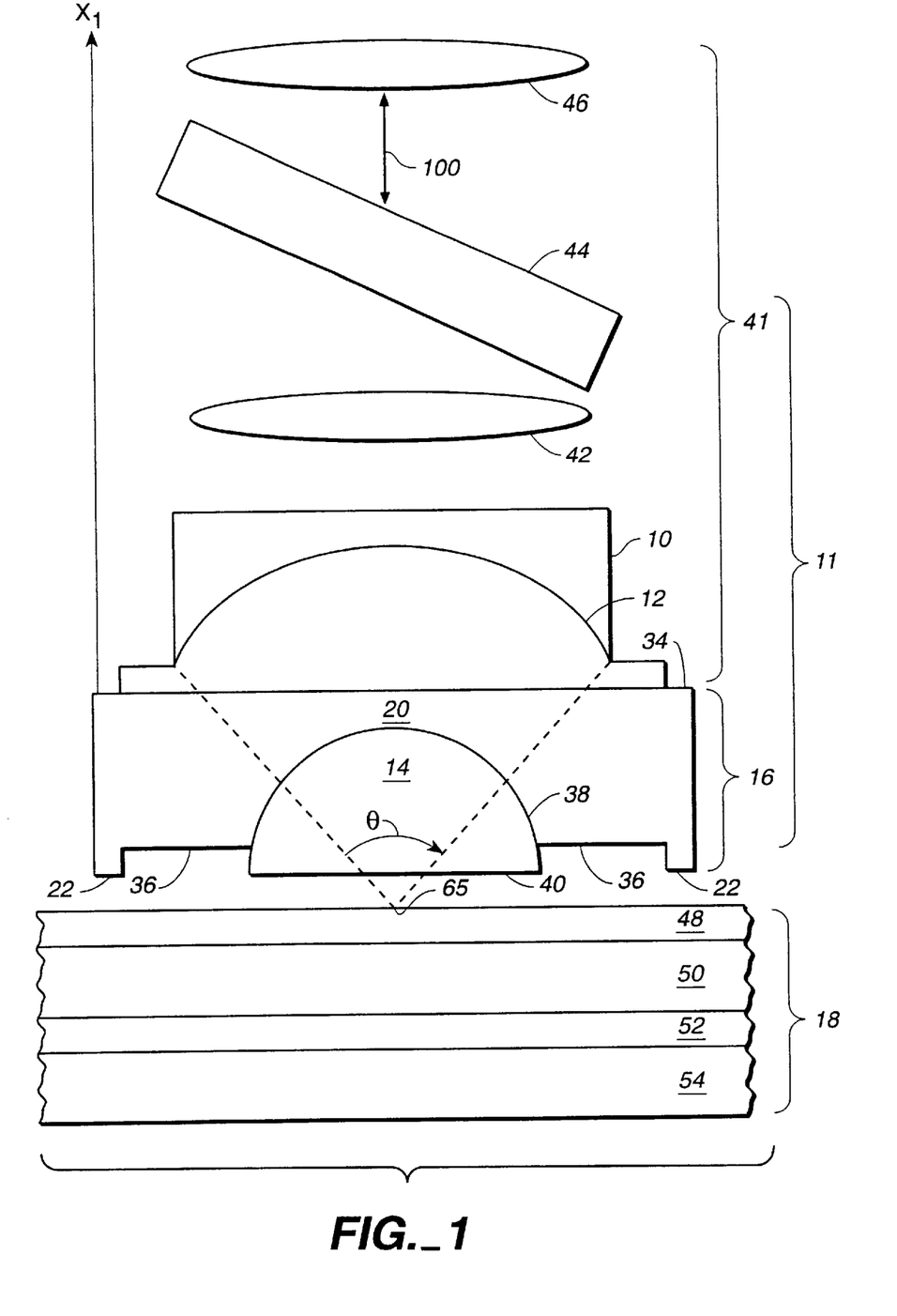
FIG. 1 is a schematic view of an optical head according to a first embodiment of the present invention, using a hemispherical SIL located at a distance above a multilayer optical recording medium such that the head is operating in a first operating regime.

FIG. 1 is a schematic diagram of a first embodiment of the invention. Head 11 is shown located generally adjacent disk 18, as in a disk drive. Disk 18 is also referred to as an optical recording medium. In this position, head 11 may be reading data from or writing data to disk 18.

Head 11 is shown as having constituent optics 41 and slider 16. The constituent optics are described below. Slider 16 has a top surface 34 and a channel surface 36. Slider 16 also has air-bearing surfaces 22. These air-bearing surfaces 22 can be designed to ride at a predetermined height above disk 18 while disk 18 is rotating at a specific speed. Slider 16 thus also rides at that predetermined height.

The distance between slider 16 and disk 18 can be small. In particular, slider 16 can operate in the "near-field" regime, where "near-field" is often used to refer to the situation where the spacing between the slider 16 and the disk 18 is less than the wavelength of the illuminating radiation and where the numerical aperture of the entire lens system is greater than unity. In the "near-field" regime, evanescent waves couple head 11 to disk 18, allowing a read or write operation to proceed.

Constituent optics 40 may include a reflector 10, an objective lens 12, an imaging lens 42, a galvanometer 44 and a relay lens 46. Collimated electromagnetic radiation, such as a laser beam, is incident on and converged by relay lens 46. The converging beam strikes galvanometer 44 and is thereby translated a predetermined distance on disk surface 18 so as to read or write to a different portion of the optical recording medium. One way of performing this translation is by use of a galvanometer. Galvanometer 44 may have refractive or reflective properties.

The translated beam is incident on imaging lens 42 which re-collimates the otherwise diverging beam. The collimated beam is then directed to objective lens 12. Reflector 10 is shown schematically to illustrate that the beam may undergo reflection before entering objective lens 12. One reason reflection is desirable is for efficient use of space inside a disk drive. Reflector 10 may be, for example, a mirror or prism which may be mounted on an arm tied to a coarse actuator (not shown). The coarse actuator is used for accessing any track on the optical recording medium.

Objective lens 12 is mounted onto or near top surface 34 of slider 16 to focus the beam onto SIL 14. Objective lens 12 may also be separated from slider 16 by a gap. Optical clear path 20 is provided between SIL 14 and objective lens 12 so that the beam may be effectively transmitted from one to the other and back again. Optical clear path 20 may be made of any optically transparent material such as air, glass or optically clear plastic.

The beam from optical clear path 20 is incident on SIL 14. SIL 14 can be, for example, a single glass hemisphere, a lesser portion of a hemisphere, or a lesser portion of a hemisphere plus a glass flat, and may be entirely or substantially contained within the body of slider 16. SIL 14 generally has a partial spherical portion 38 and a flat surface 40. Flat surface 40 can wholly contain at least one diameter of the partial spherical section. Flat surface 40 may be a surface or a flat plate, and may be generally co-planar with or in the vicinity of air-bearing surface 22. Such geometry can assist the flight of the head over the disk since flat surface 40 forms part of the slider air bearing surface.

Objective lens 12 focusses the beam in the near vicinity of flat surface 40 of SIL 14 after entering through the partial spherical surface 38 of SIL 14. More particularly, the beam comes to a focus approximately at the surface of the disk, shown in FIG. 1 as point 65. Even more particularly, the beam is coupled via evanescent waves from the flat surface 40 of SIL 14 to point 65 of disk 18.

The effect of SIL 14 on the beam is detailed in the U.S. Patent Applications noted above. To summarize, incoming converging rays from objective lens 12 are refracted at partial spherical surface 38, which results in an increased effective incident angle $\theta$ at which light from the objective lens 12 may be collected. The increase in the collection angel $\theta$ then can result in an increase in the effective numerical aperture. In a hemispherical SIL, the increased effective numerical aperture can rise with n, the refractive index of the material. Such an increase is termed herein as being in a first operating regime. Despite this increase, no refraction occurs in the hemispherical SIL, as light rays from objective lens 12 are all incident radially.

In a second operating regime, a SIL may be constructed with a glass flat attached to the flat portion. In the case where the glass flat has substantially the same index of refraction n as the SIL, where the thickness of the glass flat is r/n, where r is the radius of the partial spherical surface, then the increased effective numerical aperture can rise as $n^2$. The total effective numerical aperture is limited to n. In this second operating regime, the SIL is termed "super-hemispherical".

The converging beam focuses near flat surface 40 of SIL 14. Disk 18 is located less than a wavelength away from flat surface 40 of SIL 14 in a near-field situation. Evanescent waves generally extend a distance less than or about a wavelength from flat surface 40 of SIL 14 before being significantly attenuated. By making the distance between flat surface 40 and disk 18 small, evanescent waves couple the small beam spot from a position near or on flat surface 40 onto disk 18.

In the case where the near-field situation is not used, i.e., where the total numerical aperture is near or less than one, the disk may be further than one wavelength from flat surface 40 of SIL 14. In that case, the evanescent field is not the mediator of the data communication.

The system described above can be used to read data from an optical disk and to write data to a phase-change type or similar writable disk. In FIG. 1, the system is shown reading or writing from a point 65 on a first media layer 48.

First media layer 48 is coated on a first substrate layer 50, and can be a semi-transparent magneto-optical material or a phase-change type material. If the former, the magneto-optical material may be a rare earth—transition metal compound. An example of suitable magneto-optical materials are TbFeCo. Its thickness may be about 200–500 angstroms. First substrate layer 50 may be plastic, glass, or other such material with an index of refraction substantially the same as that of SIL 14. For protection of first media layer 48, a layer of transparent dielectric material such as silicon nitride may be deposited on the side of the magneto-optical material opposite first substrate layer 50.

Figure 2:
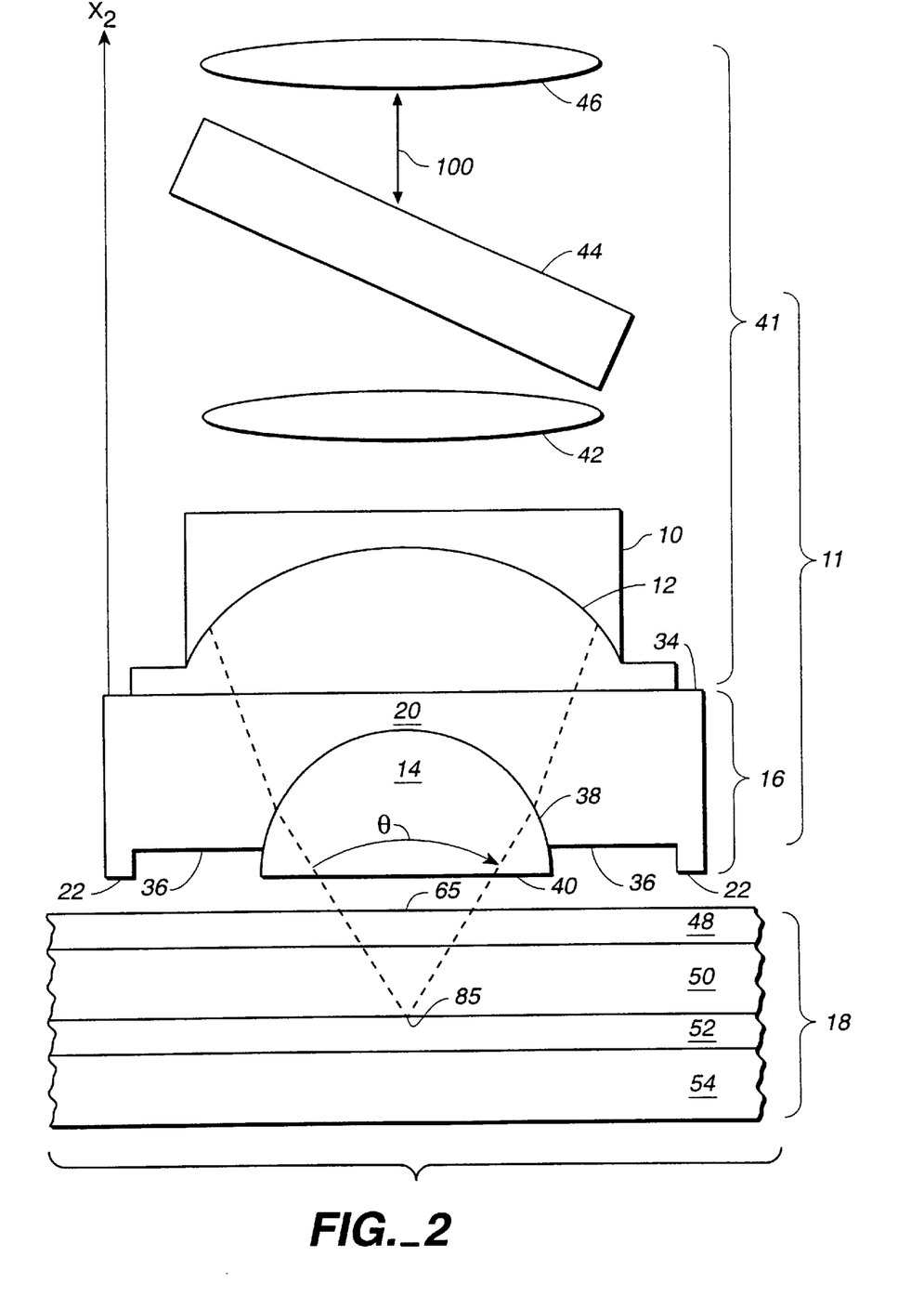
FIG. 2 is a schematic view of the optical head according to the first embodiment of the present invention, using a hemispherical SIL located at a distance above a multilayer optical recording medium such that the head is operating in a second operating regime.

The second operating regime is illustrated in FIG. 2. In this regime, a second set of media and substrate layers are used. In particular, the beam is focused on a second media layer 52 coated onto a second substrate layer 54. By using both layers, data density may at least double because, for each data portion on first media layer 48, there also is a corresponding data portion on second media layer 54.

To read data on second media layer 52, relay lens 46 is translated along an optical axis 100 from position $x_1$ to position $x_2$. The beam focus is thereby translated to the second media layer 52.

The distance the beam focus is moved depends on the thickness of the first substrate layer and the first media layer. In general, the media layer is much thinner than the substrate so that its thickness may be disregarded. In cases where this simplifying assumption cannot be made, to low orders of approximation, an effective thickness may be calculated and figured into the overall thickness of the first substrate layer.

A simple method of choosing the appropriate thickness is to use the two operating regimes of the SILs described above. In this system, a hemispherical SIL is used to read and write data to a first media layer. The same hemispherical SIL combines with the first substrate layer to form a new SIL when data from the second media layer is to be read or written. A hemispherical SIL having upstream optics that focus the beam on the base of the hemisphere, i.e., the flat portion, couples evanescent waves to a disk up to a distance of about a wavelength away from the flat portion. On the other hand, a hemispherical SIL may also be constructed with upstream optics that focus the beam a distance below the base of the hemisphere. If an optical medium is provided between the base of the hemisphere and the point at which it is focussed, where this optical medium has an index of refraction n substantially the same as that of the SIL, and where the thickness of the optical medium is r/n, where r is the radius of the partial spherical surface of the SIL, the system will operate in the super-hemispherical regime.

In either case, evanescent waves still couple the beam from its focus on the flat portion to the disk up to a distance of about a wavelength away from point at which it is focussed. Moving relay lens 46 from position $x_1$ (shown in FIG. 1) to position $x_2$ (shown in FIG. 2) moves the system from a first operating regime to a second. This in turn causes the location of the beam focus to change from first media layer 48 to second media layer 52. Of course, coupling of evanescent waves between SIL 14 and the first media surface will still occur. However, most of the beam travels through to the second layer where it is focussed.

The use of two operating range extremes makes design simpler. However, this is not required for the invention. The thickness of first substrate layer 50 can be very small or can range up to r/n. If a thickness of less than r/n is used, the amount by which the thickness is less than r/n may be made up by an equivalent optical distance of, for example, an optical flat plate in slider 16 or a top dielectric coating on the optical recording medium, or a combination of both. If a thickness of greater than r/n is used, the amount by which the thickness is greater may be made up by deceasing the thickness of SIL 14. In this case, SIL 14 may only be a portion of a hemisphere.

Figure 3:
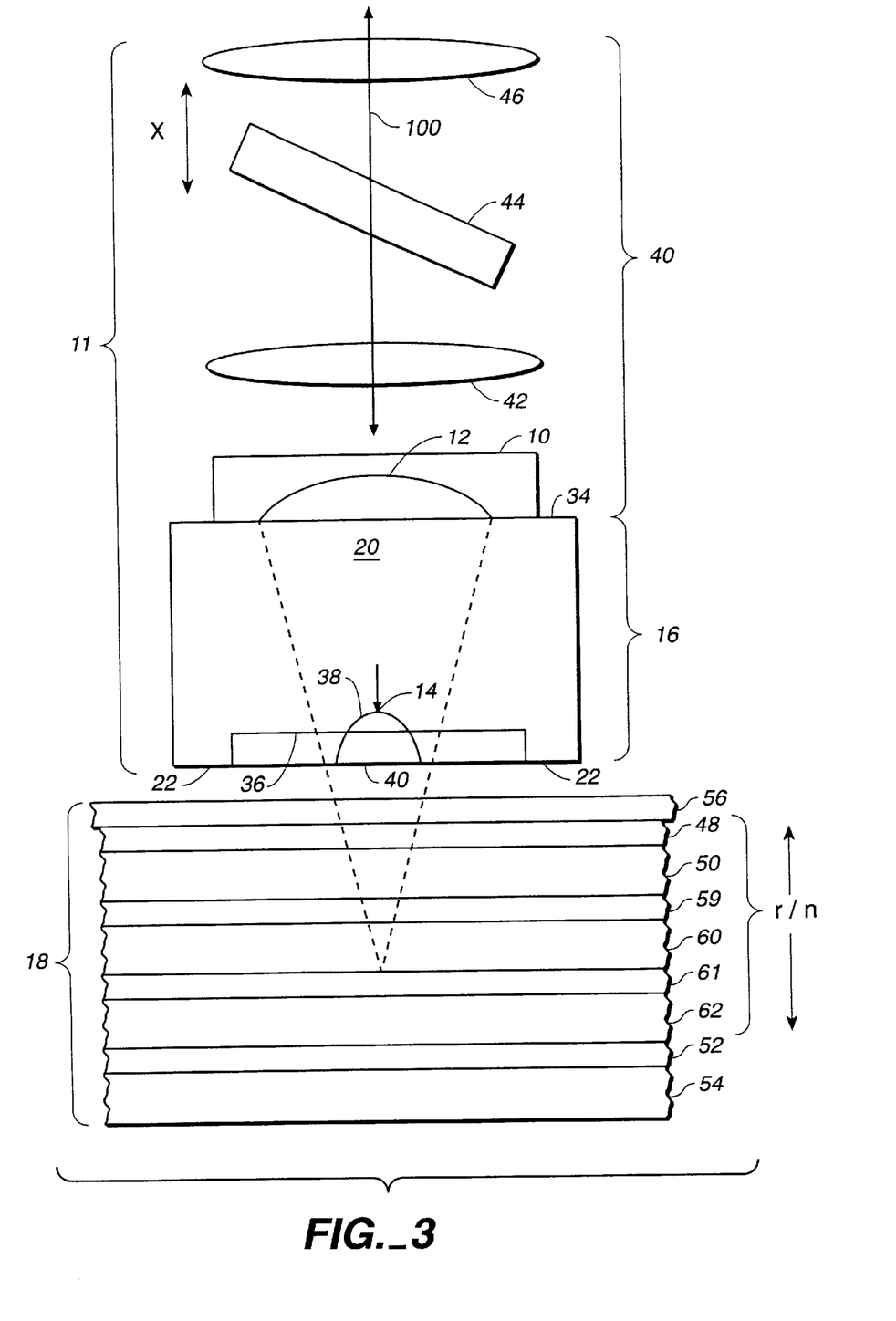
FIG. 3 is a schematic view of the optical head according to the first embodiment of the present invention where the focus is at an intermediate layer in the disk.

Since such a system can focus on any layer in disk 18 up to a depth of r/n, a number of different layers may be used within disk 18 between first media layer 48 and second media layer 52. Referring to FIG. 3, a plurality of media layers 48, 59, 61 and 52 are shown interlaced with respective substrate layers 50, 60, 62 and 54. By an appropriate location of relay lens 46, head 11 may read or write from or to any of the media layers.

Of course, the effective numerical aperture of the above embodiments may change depending upon the operating regime. In the first operating regime (FIG. 1), the effective numerical aperture varies as n (with an upper limit of n). In the second operating regime (FIG. 2), the effective numerical aperture varies as $n^2$ (with an upper limit of n). In other words, a smaller spot can be achieved in the second regime which is focussing on a location deeper into the disk. In the embodiment of FIG. 3, the effective numerical aperture varies by a power law between n and $n^2$, or as a linear combination of the two.

This effect may be used to vary the areal data density from one layer to the next. Alternatively, this property may be used to compensate for the signal attenuation caused by the beam's travel through the optical media to deeper layers. In other words, the data density may be maintained constant between layers, but a smaller spot size is used to increase the signal-to-noise ratio with data stored at lower layers.

The first and second sets of media and substrate layers may be bonded together with any standard adhesive, for example, an optical adhesive. The adhesive should preferably be transparent. Second substrate layer 54 can be plastic, glass, or aluminum, for example.

If optical reading only is desired, a selectively reflective material may be provided as second media layer 52. For example, the selectively reflective layer can be composed of a number of pits or other non-reflective spots which serve to modulate the reflected light and thus readback information.

The constituent optics can vary, although objective lens 12 can have a micro-focussing feature and an individual numerical aperture of 0.45 to 1.0. The objective lens may be made of, among other materials, glass or plastic, and has a mass typically less than 35 milligrams.

The partial spherical surface of the SIL can have a radius of less than or about 2 millimeters. The material constituting the SIL may have an index of refraction in the range of 1.4 to 2.5.

Figure 4:
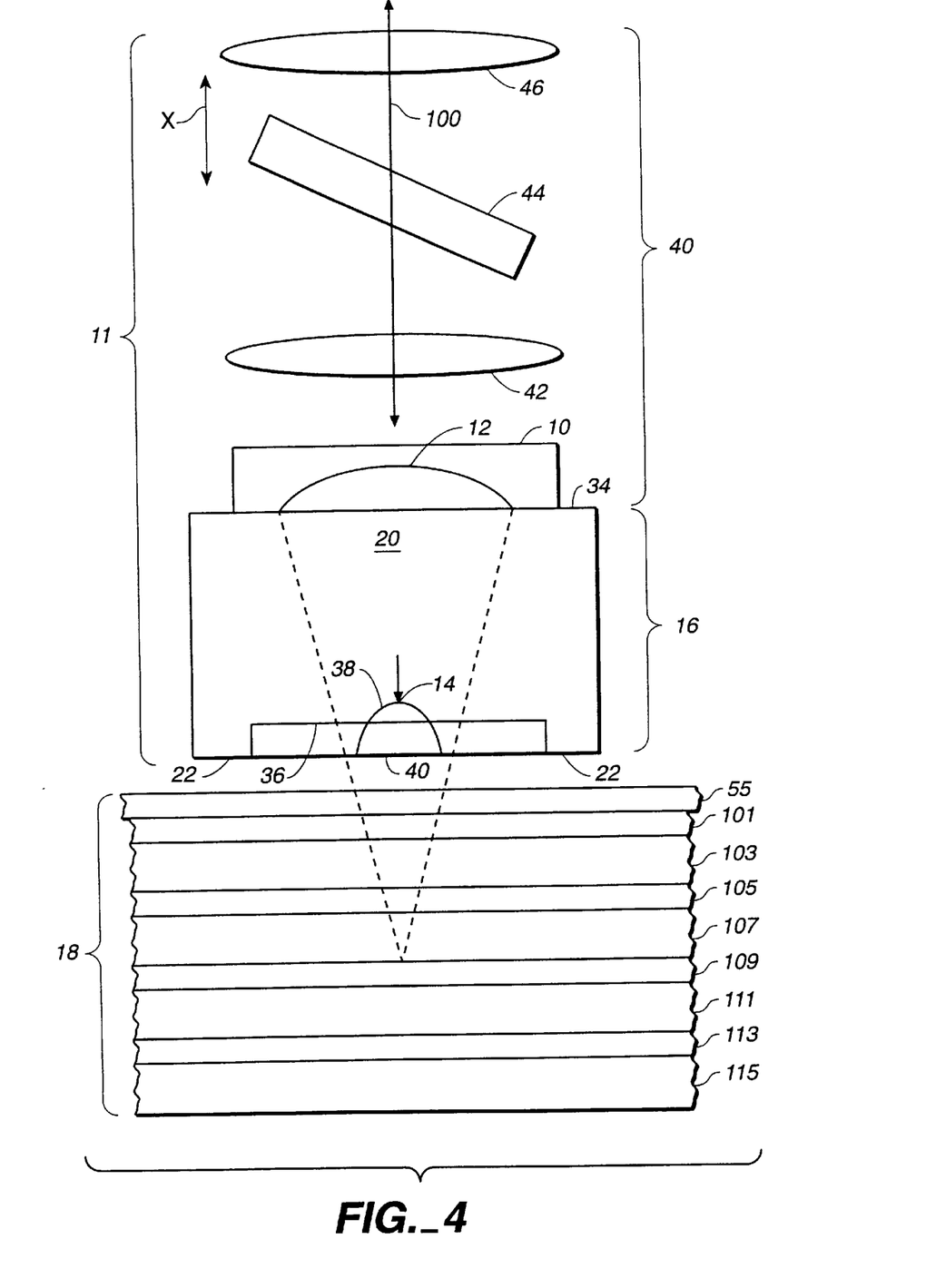
FIG. 4 is a schematic view of a second embodiment of the optical head according to the present invention, using a hemispherical SIL located at a distance above a multilayer optical recording medium.

In a second embodiment, only one of the two operating regimes is used. This embodiment is indicated in FIG. 4. The structure of head 11 is the same as that described above. This results in a small beam spot on, for example, recording layer 101 because the numerical aperture of the system of objective lens 12 and SIL 14 is equal to the product of the numerical aperture of the objective lens and the refractive index of the SIL 14. Such a numerical aperture is greater than 1.0.

This second embodiment relies in part on the optical tolerance of the SIL. A hemispherical SIL need not have a thickness of exactly r in order to function properly. The tolerance of a hemispherical SIL may, for example, lead to a requirement that the thickness be about r±50 microns. Of course, this value may change depending on the system or user's requirements.

The translation of relay lens 46 is used in the embodiment of FIG. 4 to translate the beam focus to many different layers within disk 18. In this embodiment, however, the super-hemispherical second operating regime need not be used. The system may operate solely in the first (hemispherical) regime so long as the overall distance that the beam focus must move (to access different layers) is less than or equal to the tolerance of SIL 14. For the SIL noted above, for example, this distance is about 2×50 microns or 100 microns. For m layers, the data density may be increased at least m times.

The recording medium of the present invention has a plurality of data layers. A protective coating layer 55 is shown at the top of the multilayer medium, and may be made of, for example, silicon nitride. A plurality of recording layers 101, 105, 109, and 113 are shown separated by a plurality of gap plates 103, 107, 111, and 115. Each gap plate can be made of a material having an index of refraction substantially the same as that of SIL 14. In FIG. 4, the beam is shown focused at or near a point 75 on the third recording layer 109.

The beam may focus on, for example, first recording layer 101 to read or write data. When another recording layer, for example, second recording layer 105, must be accessed, relay lens 46 is translated along the x-axis in such a way as to move the point of focus of the beam from first recording layer 101 to second recording layer 105. Despite the movement of the beam focus, the advantage of the present invention are maintained in part because the distance moved, point at which the beam is focussed, has not exceeded the tolerance of SIL 14.

In the above example, when the first recording layer 101 is at the point at which the beam is focussed, the effective SIL thickness is, at worst, r–50 microns, which is within the tolerance of the SIL (r±50 microns). When the second recording medium is being examined, the effective SIL thickness is r–50 microns+25 microns (1 gap plate), or r–25 microns. This is also within the tolerance of the SIL (r±50 microns). Thus, the SIL is producing a numerical aperture greater than 1.0, and a small spot size (high data density) is achieved in the second recording layer 105, just as in the first recording layer 101.

As noted above, the overall tolerance of the SIL may be about 100 microns. This number, of course, depends on various optical elements within the system and will vary depending on design. If each gap thickness was chosen to be 25 microns, as an example, three gap plates could be used with four recording layers (the bottom gap plate 115 may be incorporated within the overall disk substrate). This is the configuration shown in FIG. 4. The reflectivity and transmissivity of each layer may limit the number of recording layers which may be used. Eventually, less signal strength may be retrieved from layers deeper into the disk due to attenuation from the overlying layers. In all cases above, the evanescent field is coupled between SIL 14 and the recording layer.

The present invention has been described in terms of preferred embodiments. The invention, however, is not limited to the embodiments depicted and described. For example, the materials (and therefore their indices of refraction) used for the optical components may be varied, along with their optical parameters, such as focal length and numerical aperture. Moreover, the invention may be used in a number of types of optical recording and playback systems.

Therefore, the scope of invention is defined only by the appended claims.

What is claimed is:

1. A data storage system for using radiation energy to read or write data from or to an optical recording medium having at least two recording layers spaced from each other by less than one wavelength of the radiation energy, comprising:
   an optical imaging module configured to have a combination lens and to have an adjustable focus; and
   an optical head disposed relative to said optical imaging module and configured to have (1) a slider, (2) a solid immersion lens fixed to said slider and having a partial spherical surface and a substantially flat surface, and (3) an objective lens fixed to said slider to be spaced by a predetermined distance relative to said solid immersion lens,
   wherein said imaging optical module and said optical head are operable to focus the radiation energy to at least two different positions spaced away from said flat surface of said solid immersion lens by two different distances that are less than one wavelength of the radiation energy by adjusting the focus of said optical imaging module for reading and writing information in at least two different recording layers in an optical recording medium.

2. The system of claim 1, wherein said optical imaging module includes a relay lens and an imaging lens that are positioned relative to each other to produce said adjustable focus by moving said relay lens with respect to said imaging lens.

3. The system of claim 2, wherein said relay lens is adjusted to shift the focus position of the radiation energy by an amount up to about r/n, where r is the radius of said partial spherical surface and n is the index of refraction of said solid immersion lens.

4. The system of claim 1, wherein said slider includes an air-bearing surface, and said flat portion of said solid immersion lens is substantially co-planar with said air-bearing surface.

5. The system of claim 1, wherein said solid immersion lens has a shape of a hemisphere.

6. The system of claim 1, further comprising an optical recording medium which comprises:
   a first media layer;
   a first substrate layer adjacent to said first media layer and less than one wavelength thick;
   a second media layer adjacent the side of said first substrate layer opposite from said first media layer; and
   a second substrate layer adjacent the side of said second media layer opposite from said first substrate layer,
   where said optical recording medium is positioned relative to the optical head in such a way that said first media layer is less than one wavelength away from said flat surface of said solid immersion lens and a total effective numerical aperture of the system is greater than one for all layers.

7. The system of claim 6, wherein said first substrate layer having a thickness of up to about r/n, where r is the radius of said partial spherical surface and n is the index of refraction of said solid immersion lens.

8. The system of claim 6, wherein the total thickness from a bottom of said partial spherical surface of said solid immersion lens to said second media layer is up to about r/n, where r is the radius of said partial spherical surface and n is the index of refraction of said solid immersion lens.

9. The system of claim 6, wherein on the side of said first media layer opposite said first substrate layer is located a transparent dielectric material.

10. The system of claim 9, wherein said transparent dielectric material includes silicon nitride.

11. The system of claim 6, wherein said second substrate is made of a material selected from a group consisting of plastic, glass, or aluminum.

12. The system of claim 6, wherein one of said first or second media layers is of a phase-change type or of a magneto-optic type.

13. The system of claim 6, wherein said second media layer includes a selectively reflective material.

14. The system of claim 6, wherein said first and second media layers are spaced from each other less than the optical tolerance range of said solid immersion lens.

15. A method for using radiation energy to read or write data from or to an optical recording medium having at least two recording layers spaced from each other by less than one wavelength of the radiation energy, comprising:

coupling radiation energy to and from the recording layers by using an optical head which includes (1) a slider, (2) a solid immersion lens fixed to said slider and having a partial spherical surface and a substantially flat surface, and (3) an objective lens fixed to said slider to be spaced by a predetermined distance relative to said solid immersion lens; and disposing an optical imaging module relative to said optical head to couple radiation energy to said optical head, said optical head configured to have a combination lens that has an adjustable focus, wherein said imaging optical module and said optical head are operable to focus the radiation energy to at least two different positions spaced away from said flat surface of said solid immersion lens by two different distances that are less than one wavelength of the radiation energy by adjusting focus of said optical imaging module for reading and writing information in at least two different recording layers in an optical recording medium.

16. A data storage system for using radiation energy to read or write data from or to an optical recording medium having at least two recording layers spaced from each other less than one wavelength of the radiation energy, comprising:

a movable relay lens;

an imaging lens disposed relative to said relay lens; and an optical head disposed relative to said relay lens and said imaging lens, comprising: (1) a slider; (2) a solid immersion lens fixed to said slider and configured to have a partial spherical surface and a substantially flat surface; and (3) an objective lens fixed to said slider to be spaced by a predetermined distance relative to said solid immersion lens, wherein said relay lens, said imaging lens and said optical head are operable to focus the radiation energy to at least two different positions spaced away from said flat surface of said solid immersion lens by two different distances that are less than one wavelength of the radiation energy by varying a position of said relay lens for reading and writing information in at least two different recording layers in an optical recording medium.

17. The system of claim 16, wherein said relay lens is adjusted to shift the focus position of the radiation energy by an amount up to about r/n, where r is the radius of said partial spherical surface and n is the index of refraction of said solid immersion lens.

18. The system of claim 16, wherein said slider includes an air-bearing surface, and said flat portion of said solid immersion lens is substantially co-planar with said air-bearing surface.

19. The system of claim 16, wherein said solid immersion lens has a shape of a hemisphere.

20. The system of claim 16, wherein said objective lens is configured to have a numerical aperture of between about 0.45 and 1.0.

21. The system of claim 16, wherein said solid immersion lens is configured to have an index of refraction of between 1.4 and 2.5.

22. The system of claim 16, wherein the mass of said objective lens is less than about 35 milligrams.

23. The system of claim 16, wherein the radius of said spherical portion of said solid immersion lens is less than about 2 millimeters.

24. The system of claim 16, further comprising an optical recording medium which comprises:

a first media layer;

a first substrate layer adjacent to said first media layer and less than one wavelength thick;

a second media layer adjacent the side of said first substrate layer opposite from said first media layer; and a second substrate layer adjacent the side of said second media layer opposite from said first substrate layer, where said optical recording medium is positioned relative to the optical head in such a way that said first media layer is less than one wavelength away from said flat surface of said solid immersion lens and a total effective numerical aperture of the system is greater than one for all layers.

25. The system of claim 24, wherein said first substrate layer having a thickness of up to about r/n, where r is the radius of said partial spherical surface and n is the index of refraction of said solid immersion lens.

26. The system of claim 24, wherein the total thickness from a bottom of said partial spherical surface of said solid immersion lens to said second media layer is up to about r/n, where r is the radius of said partial spherical surface and n is the index of refraction of said solid immersion lens.

27. The system of claim 24, wherein on the side of said first media layer opposite said first substrate layer is located a transparent dielectric material.

28. The system of claim 27, wherein said transparent dielectric material includes silicon nitride.

29. The system of claim 24, wherein said second substrate is made of a material selected from a group consisting of plastic, glass, or aluminum.

30. The system of claim 24, wherein one of said first or second media layers is of a phase-change type or of a magneto-optic type.

31. The system of claim 24, wherein said second media layer includes a selectively reflective material.

32. The system of claim 24, wherein said first and second media layers are spaced from each other less than the optical tolerance range of said solid immersion lens.

33. A method for using radiation energy to read or write data from or to an optical recording medium having at least two recording layers, comprising:

providing an optical head which has a slider body, a solid immersion lens having a partial spherical surface and a substantially flat surface, and an objective lens, wherein said solid immersion lens and said objective lens are fixed to said slider to be spaced by a predetermined distance with respect to each other;

disposing a relay lens and an imaging lens relative to each other to couple radiation energy to an optical head;

placing th e optical recording medium relative to the optical head in such a position that the two recording layers are spaced from the flat surface by less than one wavelength of the radiation energy to form a near-field optical configuration; and adjusting a position of said relay lens relative to said imaging lens to shift focussing position of the radiation energy between the at least two recording layers to retrieve or record information from and to the at least two recording layers, wherein said relay lens, said imaging lens and said optical head in combination are operable to produce an effective total numerical aperture of greater than one for at least two recording layers.

34. The method of claim 33, further comprising:

operating said solid immersion lens in a hemispherical regime with respect to the optical recording medium to optically address one recording layer; and operating said solid immersion lens in a super-hemispherical regime with respect to the optical recording medium to optically address another recording layer.

35. The method of claim 33, further comprising:

maintaining said solid immersion lens in either a super-hemispherical regime or a hemispherical regime with respect to the optical recording medium at all times for data readout or recording;

configuring the optical recording medium in such a way that the at least two recording layers are spaced from each other by less than the tolerance of the solid immersion lens; and adjusting said relay lens to shift the focus of the radiation energy within the tolerance of the solid immersion lens.

36. The method of claim 33, wherein said relay lens is adjusted to shift the focus position of the radiation energy by an amount up to about r/n, where r is the radius of said partial spherical surface and n is the index of refraction of said solid immersion lens.

37. The method of claim 33, wherein said slider includes an air-bearing surface, and said flat portion of said solid immersion lens is substantially co-planar with said air-bearing surface.

38. The method of claim 33, wherein said solid immersion lens has a shape of a hemisphere.

39. The method of claim 33, wherein said objective lens is configured to have a numerical aperture of between about 0.45 and 1.0.

40. The method of claim 33, wherein said solid immersion lens is configured to have an index of refraction of between 1.4 and 2.5.

41. The method of claim 33, wherein the mass of said objective lens is less than about 35 milligrams.

42. The method of claim 33, wherein the radius of said spherical portion of said solid immersion lens is less than about 2 millimeters.

* * * * *